Oct. 23, 1934.      C. SAURER      1,977,896
RESILIENT MOUNTING
Filed July 17, 1931      2 Sheets-Sheet 1

INVENTOR
Curt Saurer

ATTORNEYS

Oct. 23, 1934.    C. SAURER    1,977,896
RESILIENT MOUNTING
Filed July 17, 1931    2 Sheets-Sheet 2

INVENTOR
Curt Saurer
BY
ATTORNEYS

Patented Oct. 23, 1934

1,977,896

UNITED STATES PATENT OFFICE 1,977,896

RESILIENT MOUNTING

Curt Saurer, Akron, Ohio, assignor to The Firestone Tire & Rubber Company, Akron, Ohio, a corporation of Ohio Application July 17, 1931, Serial No. 551,444

10 Claims. (Cl. 248—14.2)

This invention relates to resilient mountings such as commonly are used between two relatively movable members to dampen the vibration of the movable member, or to prevent the vibrations thereof from being transmitted to the other member.

The chief objects of the invention are to provide a resilient mounting of the character mentioned which will resist the major thrust of vibration both by compression and shearing action upon a constituent rubber element; to provide a resilient mounting that will accommodate itself to relative angular movement of relatively movable members; to prevent rattling and loosening of the attaching means of the resilient mounting; to provide a resilient mounting that will offer progressively increasing resistance to distortion under load; and to provide a resilient mounting that may be easily and economically manufactured.

Figure 1:
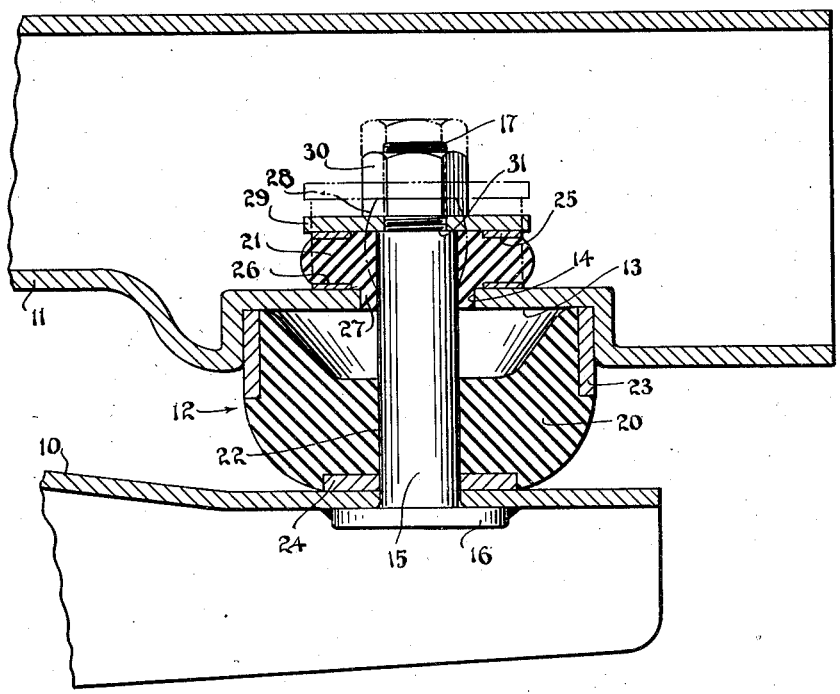
Figure 1 is a diametric section through one embodiment of the invention, and a supporting and a supported member associated therewith, the resilient member being in normal condition not under load.
Figure 2:
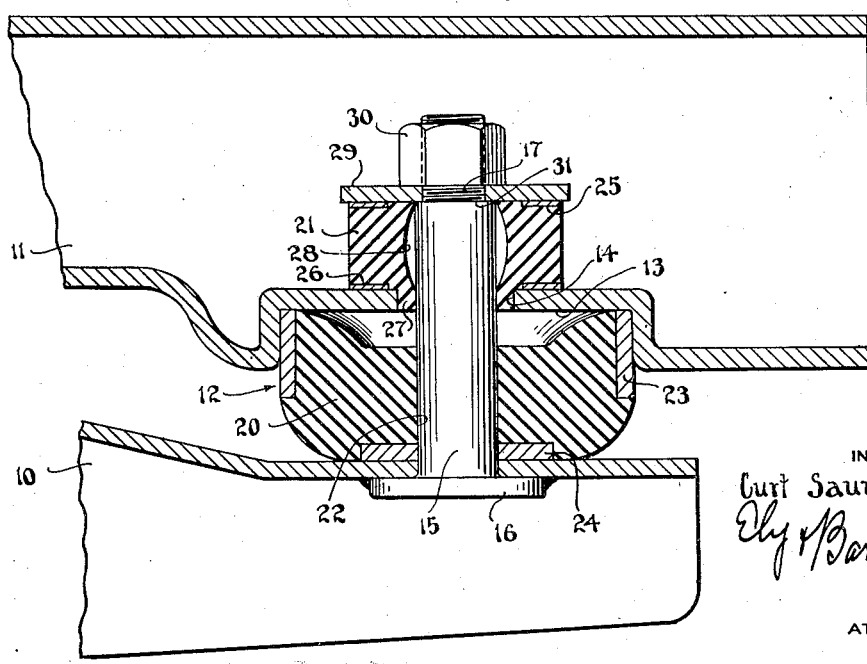
Figure 2 is a view similar to Figure 1, the resilient member being under load.
Figure 3:
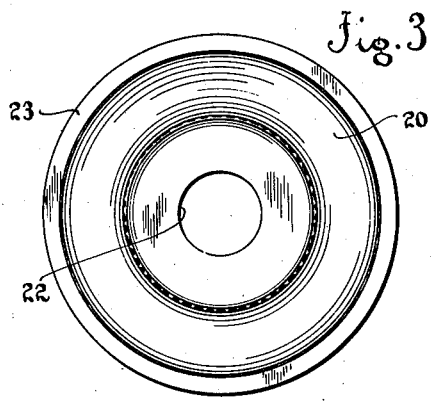
Figure 3 is a plan view of the resilient element of the structure shown in Figures 1 and 2.

Referring now to Figures 1 to 3 of the drawings, 10 is a supporting member and 11 is a member supported thereby at a number of points by resilient mountings, such as the resilient mounting designated generally 12. The supported member 11 preferably is formed with a circular recess or depression 13 to receive a portion of the mounting 12, and has an axial aperture 14 in said recess. A bolt 15 having a head 16 extends through an aperture in the supporting member 10 that is axially aligned with the aperture 14, the head of said bolt being permanently secured to the under side of the member 10 as by welding. The bolt 15 extends substantially above the recessed portion 13 of the supported member, and has a threaded terminal portion 17 of reduced diameter.

The resilient mounting 12 comprises a resilient member 20 positioned between the members 10, 11; and a resilient member 21 positioned above the member 11. The resilient member 20 consists of an annular concavo-convex rubber structure having an axial aperture 22 that fits the bolt 15, and having a cylindrical peripheral wall defined by a tubular metal facing 23 that is vulcanized to the rubber. The convex side of the member 20 has an annular washer or wear-plate 24 concentrically molded into its structure, which wear-plate rests upon the supporting member 10. The facing ring 23 fits within the recess 13 of the supported member 11, its outer periphery being in contact with the inner peripheral face of the recess and its upper marginal portion engaging the bottom of the recess.

The resilient member 21 consists of a tubular resilient rubber structure that embraces the bolt 15 and rests upon the upper surface of the recessed portion 13 of the supported member 11. The structure 21 comprises annular metal wear plates 25, 26 that are molded into its upper and lower faces respectively, and the lower face of the structure 21 is formed with an annular boss 27 that fits within the aperture 14 of recess 13. The axial aperture 28 of the structure 21 is somewhat enlarged in its central region so that the wall thereof normally stands clear of the bolt 15 as is most clearly shown in Figure 2, the arrangement permitting inward displacement of material of the structure 21 when it is compressed.

The structure 21 is secured in place by a washer 29, and a nut 30 that is threaded onto the threaded portion 17 of the bolt. Because the said threaded portion of the bolt is of reduced diameter, there is formed a shoulder 31 on the bolt which the washer engages, and which limits the compression of the member 21 by said nut and washer. The member 21 is more resilient than the member 20, and the bolt 15 is of such length that when the mounting is in the normal assembled condition shown in Figure 1, the member 21 will be under compression and distorted as shown, its upper and lower faces being closer to each other by a distance substantially equal to the distance that the member 11 moves toward the member 10 in the operation of the mounting.

Thus in the operation of the mounting, when the supported member 11 moves toward the supporting member 10, the resilient member 21 resumes its normal uncompressed condition shown in Figure 2, but always remaining in engagement with the washer 29 and upper face of the recessed portion 13, with the result that the member 21 offers progressively increasing resistance to rebound as the member 11 moves away from the member 10.

When the member 11 moves toward the member 10, the metal facing 23 of the member 20 is moved downwardly, and this movement of the facing 23 is resisted in part by the shearing action of the rubber between the inner face of the member 23 and the rubber structure 20. The downward movement of the facing ring 23 also effects a flattening out of the concavo-convex rubber structure 20, but since radial expansion of the structure is prevented by the facing ring 23, the result is to put the structure under compression which further resists the downward thrust of member 11. Since the bottom surface of the member 20 is convex in shape, it will be seen that the flattening of the structure as described will progressively increase the area of its convex surface in contact with the member 10, as is most clearly shown in Figure 2, whereby increasing resistance to distortion of the rubber structure 20 is effected.

The invention provides a resilient mounting in which the major thrust of movement between relatively movable members is resisted by the combined shearing action and compression of a resilient non-metallic structure, and the resistance to thrust increases progressively as the thrust increases. The invention also provides conveniently for resisting rebound of the resilient mounting whereby vibration of the supported member is more effectively dampened.

Figure 5:
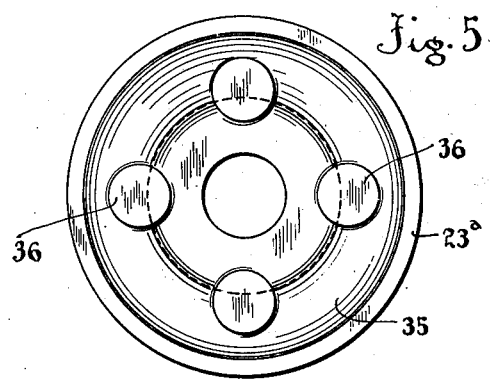
Figure 5 is a plan view of the resilient element of the structure shown in Figure 4.
Figure 4:
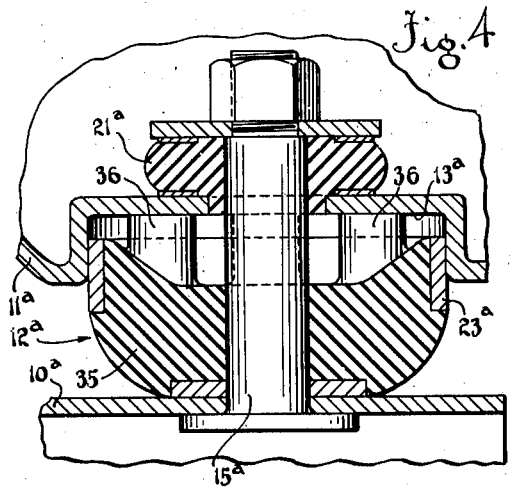
Figure 4 is a diametric section through another embodiment of the invention.

In the embodiment of the invention shown in Figures 4 and 5, the supporting structure 10ᵃ and supported structure 11ᵃ are separated by a resilient mounting 12ᵃ that is similar in all respects to the mounting 12 except that a resilient member 35 is substituted for the member 20, said member 35 being in other respects similar to the member 20, but having a plurality of integral upstanding bosses 36, 36 extending upwardly from its concave face, the tops of said bosses lying in a plane above the upper margin of the facing ring 23ᵃ. When the mounting is assembled, the tops of the bosses bear against the bottom of the recess 13ᵃ in the supported member 11ᵃ, the arrangement being such that the thrust of vibration is transmitted to the resilient member 35 solely by the bosses 36. Thus the facing ring 23ᵃ serves solely to confine the structure of the member 35 and there is no shearing strain between said members.

Figure 6:
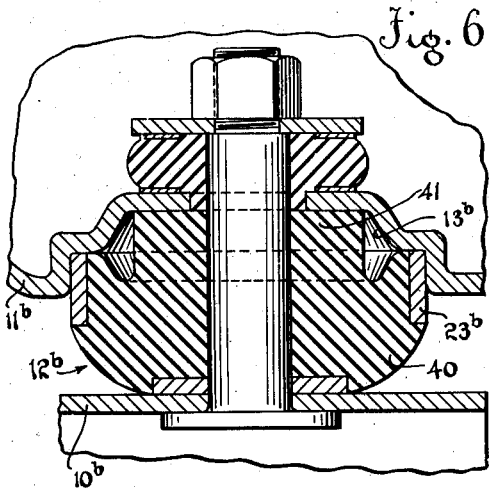
Figure 6 is a diametric section through another embodiment of the invention.

In the embodiment of the invention shown in Figure 6, the resilient mounting 12ᵇ comprises a resilient member 40 that is somewhat similar to the resilient member 20, but has an annular axial boss 41 on its concave side, which boss extends above the plane of the top edge of the facing ring 23ᵇ. The recess 13ᵇ in the supported member 11ᵇ is so shaped that both the upper margin of the facing ring 23ᵇ and the upper surface of the boss 41 engage the bottom wall of said recess. The arrangement is such that in the operation of the mounting the resilient member 40 is subjected concurrently to shearing strain between the facing ring and its adjacent surface, and to compressive strain translated through the boss 41, the compressive strain being considerably more than is present in the resilient structure 20.

Figure 7:
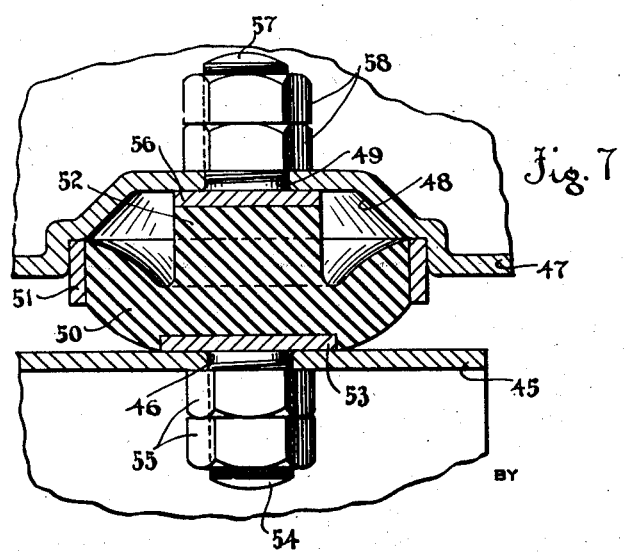
Figure 7 is a diametric section through still another embodiment of the invention.

In the embodiment of the invention shown in Figure 7, the supporting member 45 is formed with an aperture 46. The supported member 47 is formed with a downwardly opening recess 48 that is shallower at its periphery than at its central portion, and has an axial aperture 49 of the same diameter as the aperture 46 in the member 45. Mounted between the members 45, 47 is a resilient structure comprising an imperforate concavo-convex member of resilient rubber 50 having an annular peripheral metal facing 51, and formed with an axial boss 52 that extends beyond the plane of the upper edge of the facing 51. Concentrically molded into the convex face of the member 50 is a metal wear plate 53 that is integrally formed with a projecting axial threaded stud 54, said stud extending through the aperture 46 in the member 45 and having retaining nuts 55, 55 threaded thereon. A similar wear plate and stud 56, 57 respectively is molded onto the face of the boss 52, the stud 57 extending through the aperture 49 in the member 47 and having retaining nuts 58, 58 threaded thereon. The resilient mounting shown in Figure 7 functions similarly to that shown in Figure 6 except that no provision is made for checking rebound.

It will be understood that the resilient mounting disclosed therein may be used equally well in a structure where the supporting and supported members are reverse from those disclosed herein.

The invention may be otherwise modified within the spirit of the invention, and the scope of the appended claims which are not limited wholly to the specific constructions shown and described.

What is claimed is:

1. In a resilient mounting, the combination of a supporting and a supported member movable toward and away from each other, and an interposed resilient member comprising a generally concavo-convex rubber structure adapted to rest with its convex surface on one of the relatively movable members, and formed with a boss on its concave side that extends above the upper peripheral edge of its concave side and engages the other relatively movable member.

2. In a resilient mounting the combination of a supporting member, a supported member movable toward and away therefrom, and an interposed resilient member comprising an annular, generally concavo-convex rubber structure resting with its convex side on the supporting member, a metal facing on the perimeter of the rubber structure, and a boss formed on the concave side of the rubber structure and extending above the top margin of the metal facing, the supported structure being so formed as to rest upon said boss and the margin of said metal facing.

3. In a resilient mounting the combination of a supporting member, a supported member movable toward and away therefrom, and an interposed resilient member comprising a generally concavo-convex rubber structure having its convex face resting upon the supporting member, a peripheral metal facing on the rubber structure, an axial boss on the concave side of the rubber structure, wear-plates on the convex side of the rubber structure and the top of the boss respectively, and means on the wear-plates for connecting the resilient structure to the supporting and the supported members.

4. A combination as defined in claim 3 in which the supported member is so formed that it engages the adjacent margin of the metal facing on the resilient member.

5. In a resilient mounting, the combination of a supporting and a supported member movable toward and away from each other, and an interposed resilient member comprising a generally concavo-convex rubber structure adapted to rest with its convex surface on one of the relatively movable members, and formed with a boss on its concave side for engagement with the other relatively movable member.

6. In a resilient mounting, the combination of a supporting and a supported member movable toward and away from each other, and an interposed resilient member comprising a generally concavo-convex rubber structure adapted to rest with its convex surface on one of the relatively movable members, and formed with a boss on its concave side for engagement with the other relatively movable member, said boss being placed under compression for supporting a part of the load on said mounting.

7. In a resilient mounting, the combination of a supporting and a supported member movable toward and away from each other, and an interposed resilient member comprising a generally concavo-convex rubber structure adapted to rest with its convex surface on one of the relatively movable members, and provided with resilient means under compression on its concave side for supporting a portion of the load on the mounting.

8. In a vibration absorbing mounting, the combination of a supporting member and a supported member, a resilient cup-shaped cushion between said members adapted yieldingly to resist relative movement of the members toward each other, said rubber cushion having one hollow side and an opposite externally convex dome-shaped side, the hollow side of said cushion and the surface of the adjacent member defining a chamber into which said cushion may be distorted when the cushion is compressed, the external convex dome-shaped side being unconfined between its outer peripheral surface and its line of contact with the adjacent member on the opposite side of said cushion from the chamber, to permit radially outward distortion of said cushion when a compressive load is applied thereto, and a resilient rubber rebound element positioned on the side of the one of said members opposite said chamber for yieldingly resisting rebound of said cushion.

9. In a vibration absorbing mounting, the combination of a supporting member and a supported member, a resilient cup-shaped cushion between said members adapted yieldingly to resist relative movement of the members toward each other, said rubber cushion having one hollow side and an opposite externally convex dome-shaped side, the hollow side of said cushion and the surface of the adjacent member defining a chamber into which said cushion may be distorted when the cushion is compressed, the external convex dome-shaped side being unconfined between its outer peripheral surface and its line of contact with the adjacent member on the opposite side of said cushion from the chamber to permit radially outward distortion of said cushion when a compressive load is applied thereto, a resilient rubber rebound element positioned on the side of the one of said members opposite said chamber for yieldingly resisting rebound of said cushion, and a bolt passing through said supporting and supported members, and through said rubber cushion and rebound element for holding the rubber cushion and rebound element normally under initial compression.

10. In a resilient mounting, the combination of a supporting and a supported member movable toward and away from each other, and an interposed resilient member comprising a generally concavo-convex rubber structure adapted to rest with its convex surface on one of the relatively movable members, formed with a boss on its concave side for engagement with the other relatively movable member, a resilient rubber rebound element formed with a boss on one side thereof, one of said supported and supporting members being formed with an aperture, and a bolt passing through said aperture and through said resilient member and rebound element, the boss on said rebound element extending through said aperture and cooperating with the boss on said resilient member to provide a continuous sleeve for insulating the bolt from the portion of the element surrounding the aperture.

CURT SAURER.